United States Patent
Nagashima et al.

(10) Patent No.: US 10,355,611 B2
(45) Date of Patent: Jul. 16, 2019

(54) MULTI-FUNCTIONAL POWER MANAGEMENT SYSTEM

(71) Applicant: Flex Power Control, Inc., Woodland Hills, CA (US)

(72) Inventors: James Michio Nagashima, Cerritos, CA (US); Gregory Scott Smith, Woodland Hills, CA (US)

(73) Assignee: Flex Power Control, Inc., Woodland Hills, CA (US)

(*) Notice: Subject to any disclaimer, the term of this patent is extended or adjusted under 35 U.S.C. 154(b) by 201 days.

(21) Appl. No.: 14/975,701

(22) Filed: Dec. 18, 2015

(65) Prior Publication Data

US 2016/0176305 A1    Jun. 23, 2016

Related U.S. Application Data

(60) Provisional application No. 62/095,204, filed on Dec. 22, 2014, provisional application No. 62/095,432, (Continued)

(51) Int. Cl.
*H02M 3/335* (2006.01)
*H02J 3/38* (2006.01)
(Continued)

(52) U.S. Cl.
CPC ......... *H02M 3/33584* (2013.01); *B60L 53/11* (2019.02); *B60L 53/14* (2019.02); *B60L 53/22* (2019.02); *B60L 53/30* (2019.02); *B60L 53/51* (2019.02); *B60L 53/53* (2019.02); *B60L 55/00* (2019.02); *H02J 3/14* (2013.01); *H02J 3/383* (2013.01); *H02M 7/219* (2013.01); *H02M 7/5387* (2013.01); *H02J 3/32* (2013.01); *H02J 3/385* (2013.01); *H02J 2003/143* (2013.01);
(Continued)

(58) Field of Classification Search
CPC .... H02J 3/14; H02J 3/383; H02J 3/385; H02J 3/32; H02J 2003/143; H02M 7/5387; H02M 7/219; B60L 11/1816; B60L 11/1842; Y04S 20/222; Y02E 10/58; Y02E 10/566; Y02E 10/563; Y02B 70/3225
See application file for complete search history.

(56) References Cited

U.S. PATENT DOCUMENTS 5,729,450 A * 3/1998 Dimino ................. H02M 7/003
  363/132
5,801,517 A   9/1998 Borle
(Continued)

OTHER PUBLICATIONS

Bai et al., Design of an 11 kW power factor correction and 10 kW ZVS DC/DC converter for a high-efficiency battery charger in electric vehicles, Sep. 18, 2012, IET Power Electronics, pp. 1-9.*

*Primary Examiner* — Thomas J. Hiltunen
(74) *Attorney, Agent, or Firm* — Smyrski Law Group, A P.C.

(57) ABSTRACT

A power management apparatus is provided. The apparatus is configured to connect a plurality of DC power elements to a plurality of AC power elements and includes a DC interface module connected to the plurality of DC power elements, a bi-directional AC-DC converter connected to the DC interface module, and an AC interface module connected to the bi-directional AC-DC converter and the AC power elements.

14 Claims, 12 Drawing Sheets

Related U.S. Application Data filed on Dec. 22, 2014, provisional application No. 62/095,396, filed on Dec. 22, 2014.

(51) Int. Cl.

| | |
|---|---|
| *H02M 7/219* | (2006.01) |
| *H02M 7/5387* | (2007.01) |
| *H02J 3/14* | (2006.01) |
| *B60L 53/14* | (2019.01) |
| *B60L 53/22* | (2019.01) |
| *B60L 53/30* | (2019.01) |
| *B60L 55/00* | (2019.01) |
| *B60L 53/10* | (2019.01) |
| *B60L 53/51* | (2019.01) |
| *B60L 53/53* | (2019.01) |
| *H02J 3/32* | (2006.01) |

(52) U.S. Cl.
CPC ......... *Y02B 70/3225* (2013.01); *Y02E 10/563* (2013.01); *Y02E 60/721* (2013.01); *Y02T 10/7005* (2013.01); *Y02T 10/7088* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y04S 10/126* (2013.01); *Y04S 20/222* (2013.01)

(56) References Cited

U.S. PATENT DOCUMENTS

| | | | | |
|---|---|---|---|---|
| 5,825,639 A * | 10/1998 | Wagoner | | H02J 1/02 363/39 |
| 6,850,426 B2 * | 2/2005 | Kojori | | H02P 23/0004 363/123 |
| 6,949,843 B2 * | 9/2005 | Dubovsky | | H02J 3/382 307/64 |
| 7,764,527 B2 | 7/2010 | Takayanagi | | |
| 7,929,327 B2 * | 4/2011 | Haines | | H02J 9/062 363/106 |
| 7,944,188 B1 * | 5/2011 | Wittenbreder, Jr. | | H02M 1/4208 323/222 |
| 8,242,627 B2 * | 8/2012 | Ichikawa | | B60L 1/003 180/65.265 |
| 8,315,031 B2 * | 11/2012 | Kyouda | | H01G 2/106 361/301.3 |
| 8,369,100 B2 * | 2/2013 | Azuma | | B60K 6/48 361/766 |
| 8,604,746 B2 * | 12/2013 | Lee | | B60L 11/182 320/101 |
| 8,670,223 B2 * | 3/2014 | Imamura | | H01G 2/04 361/323 |
| 8,710,699 B2 * | 4/2014 | Binder | | H02J 3/383 307/64 |
| 9,236,189 B2 * | 1/2016 | Oh | | H05K 1/0231 |
| 9,263,968 B2 * | 2/2016 | Potts | | H02M 3/33584 |
| 9,509,206 B2 * | 11/2016 | Lee | | H02M 1/4208 |
| 9,647,493 B2 * | 5/2017 | Okuda | | H02J 3/32 |
| 9,787,117 B2 * | 10/2017 | Bai | | H02J 7/0052 |
| 9,887,616 B2 * | 2/2018 | Bai | | H02M 1/12 |
| 9,960,698 B2 * | 5/2018 | Nagashima | | B60L 11/1816 |
| 2002/0070399 A1 * | 6/2002 | Kitagawa | | H01G 4/258 257/296 |
| 2003/0030385 A1 * | 2/2003 | Toyama | | H05B 41/28 315/291 |
| 2003/0218887 A1 | 11/2003 | Kojori et al. | | |
| 2004/0062059 A1 * | 4/2004 | Cheng | | B60L 11/1814 363/17 |
| 2004/0090803 A1 * | 5/2004 | Kerstetter | | H02M 1/126 363/39 |
| 2005/0263845 A1 * | 12/2005 | Saito | | H01G 2/10 257/516 |
| 2006/0103341 A1 | 5/2006 | Steigerwald | | |
| 2008/0013351 A1 | 1/2008 | Alexander | | |
| 2008/0067869 A1 * | 3/2008 | Evans | | H02J 3/387 307/11 |
| 2009/0273297 A1 * | 11/2009 | Kelly | | H02M 1/4225 315/247 |
| 2011/0292686 A1 * | 12/2011 | Oka | | H02M 1/14 363/13 |
| 2012/0257429 A1 | 10/2012 | Dong et al. | | |
| 2013/0094261 A1 | 4/2013 | Kern | | |
| 2013/0183043 A1 * | 7/2013 | Elberbaum | | G01R 19/00 398/115 |
| 2013/0229777 A1 * | 9/2013 | Otremba | | H01L 23/291 361/783 |
| 2013/0285459 A1 * | 10/2013 | Jaoui | | H02J 3/32 307/80 |
| 2015/0001958 A1 * | 1/2015 | Abe | | H02J 5/005 307/104 |
| 2015/0036389 A1 * | 2/2015 | Freeman | | H02M 1/10 363/16 |
| 2015/0131337 A1 * | 5/2015 | Gabrielsson | | H02M 1/4241 363/21.03 |
| 2015/0251547 A1 * | 9/2015 | Nonomura | | B60L 11/1816 320/109 |
| 2015/0266382 A1 * | 9/2015 | Penmetsa | | B60L 1/003 307/10.1 |
| 2015/0280593 A1 * | 10/2015 | Ando | | H02M 1/42 363/17 |
| 2015/0365003 A1 * | 12/2015 | Sadwick | | H02M 3/28 363/21.01 |
| 2016/0172877 A1 * | 6/2016 | Xue | | H02J 7/0052 320/145 |
| 2016/0181944 A1 * | 6/2016 | James | | B60L 11/1816 363/17 |
| 2016/0185241 A1 * | 6/2016 | Kinomura | | B60L 3/00 307/10.1 |

* cited by examiner

MULTI-FUNCTIONAL POWER MANAGEMENT SYSTEM

This application claims priority based on:

U.S. Provisional Patent Application Ser. No. 62/095,204, inventors James Nagashima et al., entitled "Multi-Functional Power Management System," filed Dec. 22, 2014;

U.S. Provisional Patent Application Ser. No. 62/095,396, inventors James Nagashima et al., entitled "Highly Reliable AC-DC Power Converter with High Voltage DC Link," filed Dec. 22, 2014, and U.S. Provisional Patent Application Ser. No. 62/095,432, inventors James Nagashima et al., entitled "Method to Reduce Losses in a High Voltage DC Link Converter," filed Dec. 22, 2014, and the present application is being filed concurrently with:

U.S. patent application Ser. No. 14/975,677, inventors James Nagashima et al., entitled "Reliable AC-DC Power Converter with High Voltage DC Link," and U.S. patent application Ser. No. 14/975,693, inventors James Nagashima et al., entitled "Method to Reduce Losses in a High Voltage DC Link Converter,"

the entirety of all of which are incorporated herein by reference.

BACKGROUND OF THE INVENTION

Field of the Invention

The present invention relates generally to a power conversion and more specifically to integrating power conversion processes, devices, and techniques using a bi-directional AC to DC and DC to AC power conversion device.

Description of the Related Art

Current power converter designs provide power flow in a single direction and are suitable for either rectifying AC to DC such as in a switched mode power supply, inverting DC to AC, converting DC to DC at different voltage levels, or AC to AC conversion such as a transformer. Today's designs typically only provide one form of conversion, thus requiring separate modules or components to realize a separate one of the aforementioned types of conversions. In order to implement multiple types of conversions, multiple converters are required. Implementing power conversion solutions in this manner results in designs requiring several components occupying a large amount of area or real estate, as well as complicated wiring schemes to integrate the several separate components in arrangements such as power utility grids, household loads, solar panel arrays, and fixed storage devices including batteries and the like.

Residential power applications are becoming more prevalent with the emergence of electronics for solar energy conversion systems, electric vehicle charging devices for battery operated electric and plug-in hybrid gas/electric vehicles, backup power supplies such as batteries, and power quality correction units. Each of these many systems requires its own dedicated and unique suite of power electronics to perform required power conversion processes even though no one conversion function or operation is typically needed during an entire 24 hour daily operating cycle.

In general, system designers have limited flexibility when choosing equipment for residential power applications and end up installing individual discrete systems supporting all of the electronics deployed, potentially including redundant components. As a result, the lack of available integrated solutions add redundancy, complexity, and cost, and present physical space demands and heat issues for each conversion system installed.

Significant market growth exists in areas such as Photovoltaic (PV), e.g. solar power generation, Plug-In Electric Vehicle (PEV) and Plug-In Hybrid Electric Vehicle (PHEV) charging infrastructures, and stationary energy storage. Current emphasis in the broad sense is toward integration of these newer and increasing technologies with the Smart Grid, the electronic network that uses digital communication technology to monitor and react to changes in usage. Efficient Smart Grid integration of these distributed resources may be highly beneficial with issues such as load balancing, voltage regulation, demand response, real time pricing, ancillary services, peak shaving, renewable generation integration, and so forth.

Several areas in power electronics that show promise for growth now and into the future, including Photovoltaic, or solar DC to AC inverters, Electric Vehicle Chargers, Whole House Power Systems (e.g. Backup, Off-Grid), and Power Quality Correctors. Today, each of these functions requires separate hardware with commensurate expense and complexity.

It would therefore be advantageous to provide a system that overcomes issues with the deployment of multiple discrete devices, including those having overlapping feature and functions. Further, it would be beneficial to provide interoperable solutions configured for scheduled use based on utilization demands and depending on circumstances encountered.

SUMMARY OF THE INVENTION

According to a first aspect of the present design, there is provided a power management apparatus configured to connect a plurality of DC power elements to a plurality of AC power elements. The power management apparatus comprises a DC interface module connected to the plurality of DC power elements, a bi-directional AC-DC converter connected to the DC interface module, and an AC interface module connected to the bi-directional AC-DC converter and the AC power elements.

According to a second aspect of the design, there is provided a power management apparatus, comprising a DC interface module connected to a plurality of DC power elements, a bi-directional AC-DC converter connected to the DC interface module, and an AC interface module connected to the bi-directional AC-DC converter and a plurality of AC power elements.

According to a third aspect of the design, there is provided a power management apparatus comprising a bi-directional AC-DC converter comprising a bidirectional boost converter coupled to an AC source, a high voltage DC link capacitor circuit coupled to the bidirectional boost converter and comprising at least one capacitor and a DC to DC converter circuit coupled to the high voltage DC link capacitor circuit and to a DC source. The bi-directional AC-DC converter is further coupled to at least one of AC and DC interface electric vehicle charging hardware.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

Figure 1:
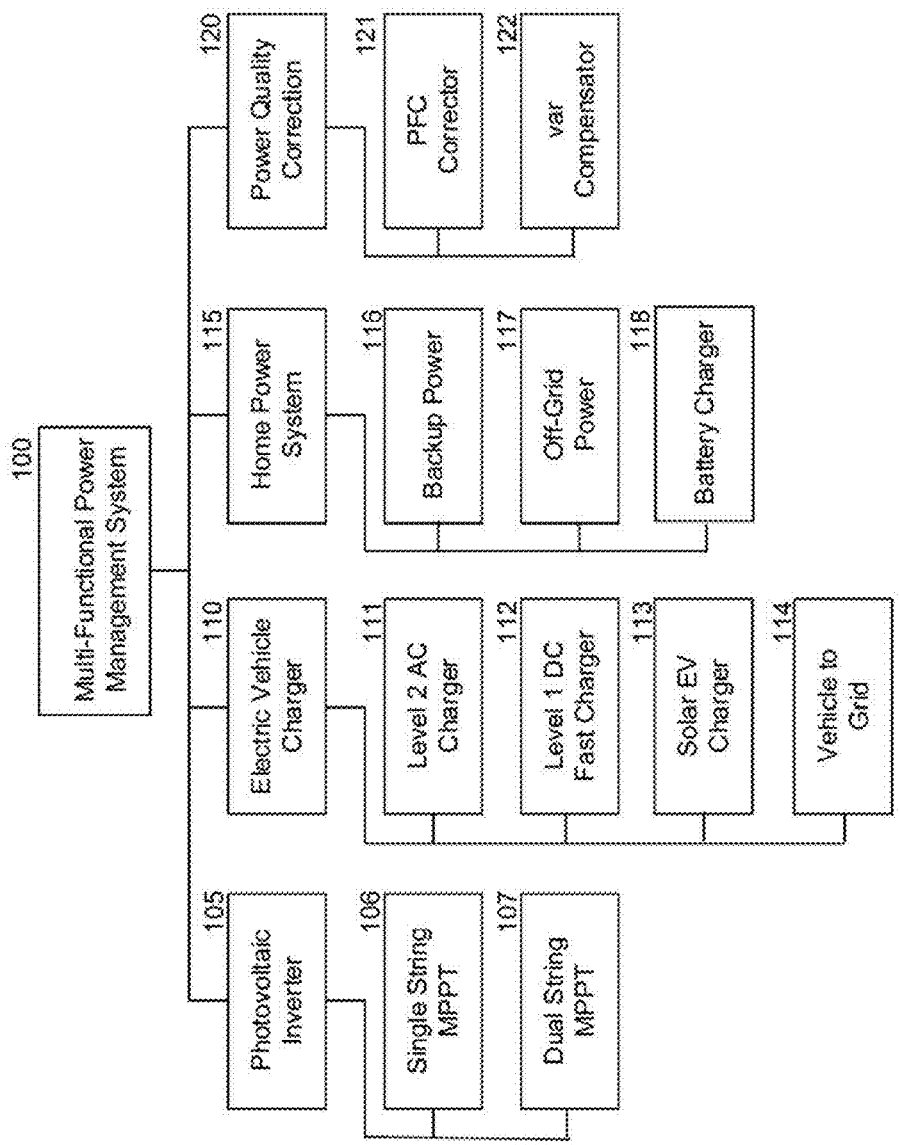
FIG. 1 is a block diagram representation illustrating power management functions in accordance with the present design.

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

The present design is directed to a power converter and power management system configured to interoperate between and various AC and DC power sources and power sinks. The system leverages an integrated bi-directional power conversion apparatus for converting either AC power to DC power or DC power to AC power when the sources and sinks differ in a single modular electronic power management unit. The system monitors the power sources and sinks and switches each to in-use or out-of-service status depending on conditions, such as power availability, loads or demands, and like operational factors. The system connects the in-use sources to the in-use sinks to form a power flow path for the transmission or transfer of power from one to the other.

Improved system performance is achieved in two general ways: first, mechanical aspects, wherein the system reduces the total size, weight, thermal output, and interconnection complexity. Second, the system improves performance for system architectural integration aspects, wherein the system eliminates duplicate functions, redundant connections, and centralizes user control with a common integrated management facility. The system improvements simplify the overall power management solutions resulting in lower installation, functional component, and operation costs and afford an expandable, flexible, and upgradable energy management system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. For the sake of brevity, conventional techniques related to inverters, DC to DC converters, photovoltaic components and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter. The description used herein is for an integrated, bi-directional AC to DC, multi-functional power converter that represents an exemplary embodiment, but the not intended to be the only application of the invention.

The disclosed design is for an integrated, modular, power electronics system that can perform one or all of the rectifying, inverting, and converting functions in a single unit. The benefits of the concept present invention include: lower functional cost, expandability, obsolescence proof, reduced size, weight, total energy system integration, and lowest total installation cost. The cost of adding modules to the present design may provide for considerably lower implementation costs than the cost of installing separate equipment for any single function as required in current designs.

Thus according to one aspect of the present design, there is provided a power conversion and management system comprising at least one Bi-Directional Converter, an AC Interface Module, a DC Interface, and User Control Module, wherein the User Control Module manages the switching in and out of use, connections, and like operations for the system components based on desired power conversion and power flow paths. The system further comprises an AC Level 2 Vehicle Charging Module and a DC Level 1

Charging Module, wherein the User Control Module manages the switching in and out of use, connections, and like operations for the charging components based on the desired power flow path.

According to another aspect of the present design, there is provided a power conversion and management system comprising an energy resource controller further comprising integrated communications, switching and connection controls, and conversion electronics technology for managing the power conversion facilities within a household.

The power management and conversion system may include modular component and device power electronics configured for incorporating the capabilities, features, and controls necessary to cost effectively and efficiently balance the flow of energy between a combination of power sources, including the AC utility grid, solar panel arrays, and batteries based energy storage in an arrangement for energizing a consumer's home. The power electronics system may provide for integrating PEV charging functionality which can be supported by power from any of the three energy sources. The conversion system may provide for the necessary power interconnections to the home and the grid from the solar panel and the energy storage system, and so forth.

The following bi-directional AC to DC power converter system disclosed may include, but is not limited to, an AC power grid, a house or home wiring system, for example at the circuit breaker box, an energy storage device such as a battery, a photovoltaic (PV) input such as a solar panel, and an AC to DC electric vehicle (EV) charger, in an arrangement to form an integrated multi-functional power management system in accordance with the present invention.

The present design is configured in a modular arrangement for combining system functions for PV inverters (solar), EV chargers, and whole house power, including but not limited to backup, off-grid, and power quality corrector systems. The present designs modular arrangement may provide a single cohesive multi-functional power converter system with integrated management functions directed to perform one, or any combination of these currently separate system functions in a single unit.

FIG. 1 illustrates the major power management functions for an integrated multi-functional power management system (MFPMS) 100 in accordance with the present design, wherein separate functions may be combined to form a single power conversion system. The power management system may functionally arrange management facilities within a single management tier between four exemplary power function modules: photovoltaic inverter 105, electric vehicle charger 110, home power system 115, and power quality correction 120. The power function module management tier may provide control for switching in and out of use and connections for functions between the tier members. For example, power management system 100 may instruct photovoltaic inverter 105 module and electric vehicle charger 110 module to form a charging circuit from a solar panel array to a vehicle's battery charging facility. The control design may include an end-to-end circuit and form a power flow path between the two modules to transfer power from one to the other.

Photovoltaic (PV) inverter 105 module shown in FIG. 1 may provide sub-tier management functionality to control a variety of solar panel array configurations. Each sub-tier function may involve an algorithm configured for managing a specific PV component, device, or element. For example, Single String maximum power point tracking (MPPT) module 106 may include an algorithm tailored for controlling the switching and connecting for a single string solar panel array arrangement and MPPT functionality. Dual String MPPT module 107 may include an algorithm tailored for controlling the switching and connecting for a dual string solar panel array arrangement and associated MPPT functionality. In addition, Dual String MPPT module 106 may be configured for controlling a dual string dual MPPT arrangement, where an MPPT is dedicated to each string to ensure maximum available energy is collected from each string independently. In general, the present design's MPPT functionality may include a DC to DC conversion circuit commonly found in PV inverter systems.

Electric Vehicle (EV) Charger module 110 shown in FIG. 1 may provide sub-tier management functionality to control a variety of electric vehicle source and sink configurations. Each sub-tier function may involve an algorithm configured for managing a specific EV component, device, or element. For example, Level 2 AC Charger module 111 may include an algorithm tailored for controlling the switching and connecting for single phase 208-240 volt AC energy source to a vehicle's on-board charger employing either Society of Automotive Engineers (SAE) J1772 connectors for up to 16.8 kW operation, International Electro-technical Commission (IEC) 62196 connectors for up to 44 kW operation, or like standard compliant connections. Level 1 DC Fast Charger module 112 may include hardware and an algorithm tailored for controlling the switching and connecting for DC output of the bi-directional AC-DC converter to a SAE J1772 Combo Charging Systems (CCS) connector directly to the electric vehicle high voltage battery pack. In addition, the present design may provide for supporting SAE Combo Charging Systems (CCS) involving communications facilities for operations between the EV, off-board charger, and the smart grid. Solar EV Charger 113 module may include an algorithm tailored for controlling the switching and connecting for a solar panel array to a Level 2 vehicle's on-board charger where it is converted to direct current prior to charging the battery pack.

In a further configuration, the present design's solar EV charging algorithm may include logic for delivering energy collected at the panel to an off-grid power system involving a dedicated lithium ion, or other chemistry, battery pack module configured for energy storage. Vehicle to Grid Charger module 114 may include an algorithm tailored for controlling the switching and connecting for an electric vehicle's battery pack for tying to a utility's power grid. In this configuration vehicle to grid algorithms may include logic for switching a DC to AC inverter in between the batteries and the grid for power conversion and establishing the power flow path.

Home Power System module 115 shown in FIG. 1 may provide sub-tier management functionality to control a variety of AC household loads and for backup power facilities. Each sub-tier function may manage a specific Home component, device, or element. For example, Backup Power module 116 may control switching and connecting for an energy storage device such as a dedicated battery or batteries. Off-Grid Power module 117 may supply power to the home from a solar panel array or batteries. Battery Charger module 118 may control switching and connecting either the AC grid or solar panel array to an energy storage device such as a depleted backup battery pack.

Power Quality Correction module 120 shown in FIG. 1 may provide sub-tier management functionality to control various distortions and noise introduced by the AC grid and condition the received grid power sufficient to operate sensitive household electronics and like AC loads requiring clean power. For example, Power Factor Corrector (PFC)

module 121 may introduce either an active or passive device into the AC Current to add a leading or lagging element to improve voltage regulation, reduce transmission losses, and stabilize the current. PFC module 121 may monitor the AC source and determine the necessary correction to realize power factors near a value of 1 (one). Volt-ampere reactive (var) Compensator 122 may monitor the phase angle between the AC voltage and current and modifying the angle when determined to not be in phase to compensate for reactive loads.

MFPMS 100 may simultaneously invoke various functional modules to operate individual power conversion facilities and realize power flow paths. The operation for invoking these modules to realize the major power management functions are illustrated in FIGS. 4-11 and disclosed in the accompanying sections.

Today's residential power usage involves power conversion functions using devices such as the solar inverter, EV AC Charger, EV DC charger, backup power (e.g. battery), power quality, and vehicle to grid transfers using individual conventional converters as shown in Table 1. For example, energy conversion from the solar inverter typically requires transformation of DC power into AC power. In other situations, such as energy conversion from the EV DC charger, transformation of AC power to DC power and/or vice versa may be required. Each of these power usage scenarios are realized through implementing a single conversion function, from an independent converter, where only unidirectional power flow is required, i.e. power flows in only one direction. Table 1 relates the power flow, typical power level, and usage for each relevant conversion function.

TABLE 1

Typical Residential Power Usage

| Function | Power Flow | Typical Power Level | Usage |
|---|---|---|---|
| Solar Inverter | DC to AC | 3 to 10 kW | 10 to 12 hours/day |
| EV AC Charger | AC Only | 3.3 or 6.6 kW | 3 to 10 hours/day |
| EV DC Charger | AC to DC | up to 10 kW | 1 to 3 hours/day |
| Backup Power | DC to AC | 1 to 3 kW | Infrequently |
| Power Quality | DC to AC | <1 kW | As needed |
| Vehicle to Grid | DC to AC | 3 to 10 kW | Upon utility request |

The present design includes a bi-directional converter (BDC) power conversion arrangement in a configuration affording power flow, or power processing, in two directions. An embodiment of the present design's MFPMS BDC 200 is illustrated in FIG. 2 as component within a multi-functional power management system.

Figure 2:
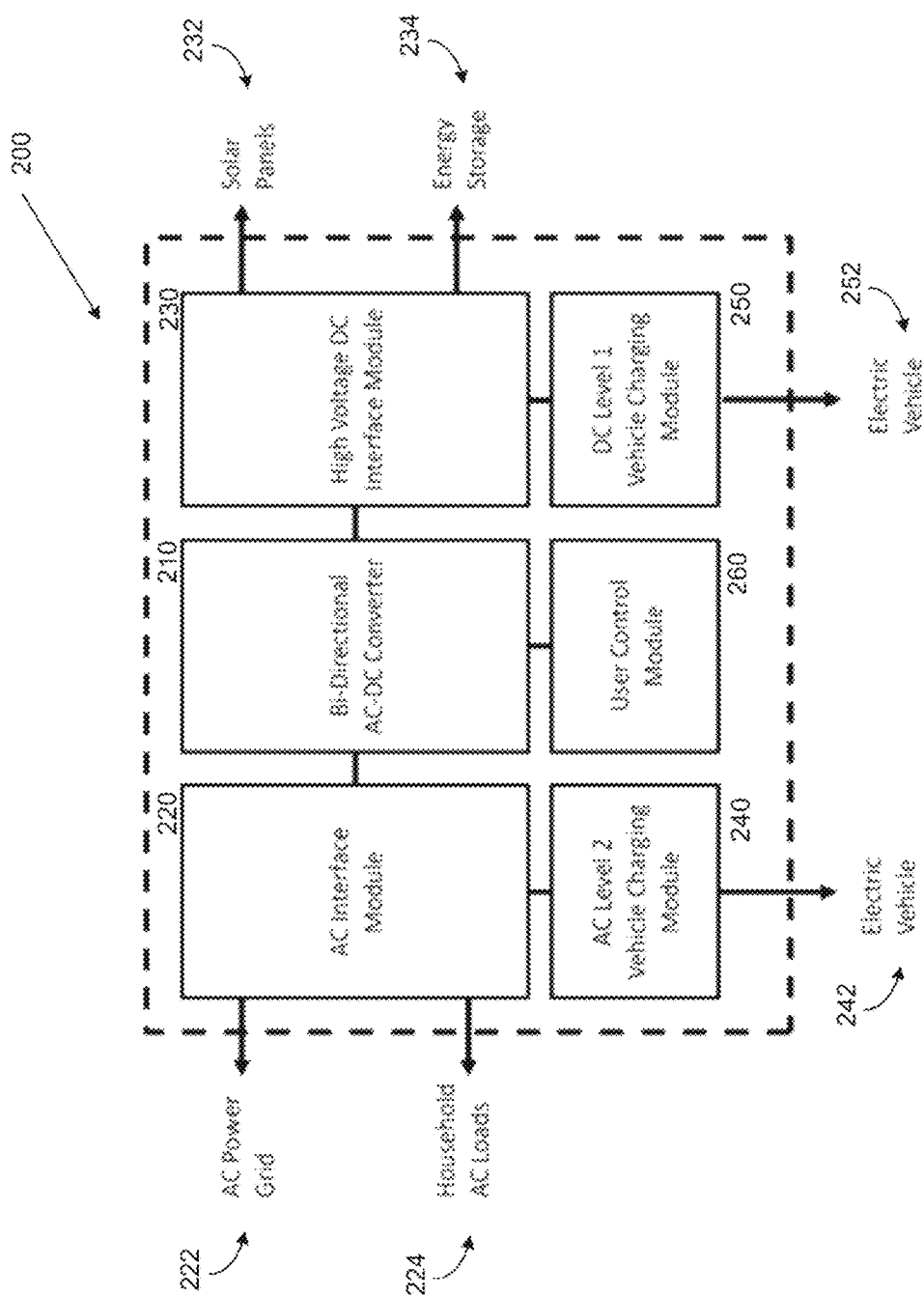
FIG. 2 is a system level block diagram for a multi-functional power management system comprising a bi-directional AC-DC converter in accordance with the present design.

From FIG. 2, the present design may include bi-directional AC to DC converter 210 comprising a high frequency silicon carbide SiC switching AC to DC converter, a 0.99 Power Factor Correction (PFC) front-end module, a high frequency transformer providing galvanic isolation with small size and weight as well as bi-directional operation for providing power in either direction, an AC Input/Output range capable of 240 VAC single phase/208V AC operation, single phase or three phase, DC Input/Output range capable of 200-400V DC operation, a power rating of 10 kW, and air cooling. The present design may include more than one bi-directional AC to DC Converter. The bi-directional AC to DC converter may be positioned between AC Interface module 220 and High Voltage DC interface module 230.

BDC operation, from left to right in the FIG. 2 arrangement shown, may provide for conversion from AC Power Grid 222 to DC Energy Storage 234, rectifying the power, and right to left operation may provide for Solar Panels 232 DC to Household AC Loads 224 conversion or inverting the power. In a complementary arrangement, the present design may transfer DC power stored within batteries in Energy Storage 234 and convert this power to AC power for delivery to Household AC Loads 224, AC Power Grid 222, and/or a combination of these two.

The present design may include an AC Interface Module 220 comprising grid connections for 240V AC/60 A single phase service, connections for attaching to a home power service panel, AC voltage and current monitoring facilities, and safety disconnects.

The present design may include at least one AC Interface module for each of the disclosed configurations. The AC Interface Module may be configured between AC Power Grid 222 and AC level 2 Vehicle Charging Module 240 for transferring power to Electric Vehicle 242 internal batteries. In this arrangement the BDC is not required since the AC level 2 Vehicle Charging Module 240 only requires providing AC power to the vehicle on-board charger.

In a further exemplary MFPMS arrangement (not shown), the electric vehicle's batteries may return power to the grid wherein the MFPMS connects the batteries of the electric vehicle to the BDC to invert DC to AC. The resultant DC power is transmitted to DC Interface Module 250 for delivery back onto AC Power Grid 222. In a similar manner, the vehicle's batteries may be used to power Household AC Loads 224.

High Voltage DC Interface Module 230 includes connections for a solar panel array, connections for a high voltage energy storage device, such as a battery or batteries, an optional transfer relay positioned between the solar panel array and the energy storage device, and a DC disconnect. The present design may include more than one DC Interface Module. The High Voltage DC Interface Module 230 may be configured between Solar Panels 232 and Energy Storage 234, or a combination thereof, and DC Level 1 Vehicle Charging Module 250 to transfer power to the internal batteries of Electric Vehicle 252.

The present design may also include a Level 2 AC Vehicle Charging Module 240 wherein either a DC or AC charging device may be configured to fit in the same provisioned physical slot but provides a different complement of connections, a SAE J1772 compliant charge coupler, i.e. plug, for PHEV/PEV charging applications, rated for AC charging up to 18 kW, where most EVs are either 3.3 or 6.6 kW, separate smart metering output for EV charging and provisions for interface and safety electronics including interlock, pilot, proximity, and control features. The Level 2 AC Vehicle Charging Module is an optional component for use with the present design.

The present design may include a Level 1 DC Vehicle Charging Module 250 charging device configured to fit in the same provisioned slot discussed above but affording different connections, and a high powered charge plug for DC charging, such as an SAE CCS, or like device, and provisions for interface and safety electronics including communications.

The present design may be limited by the 10 kW converter power rating. If the EV is enabled with DC capabilities, the realized rate of charge may be up to 50% faster than when using the 6.6 kW Level 2 charging facility or 300% faster than when using the 3.3 kW charging facility. The Level 1 DC Vehicle Charging Module is an optional component for use with the present design.

The present design may further include a User Control Module 260, which may include a graphical user display with touch screen controls, integration facilities for all power management functions and setup operations, and communications interface comprising plug-in modules for cellular, Wi-Fi, PowerLine™ communication, Ethernet, and so forth. The present design may include more than one User Control module. The main functions of the control module are monitoring signals present at the AC grid, Solar Panels, Energy Storage, Household AC Loads, Electric Vehicles, and so forth, and controlling the switching of the BDC into and out of use for each MFPMS operational scenario.

Each module within the present design may include hardware, firmware, and/or software functionality in an arrangement to realize the operation and functionality disclosed, including facilitating interoperability and power transfer between modules.

Figure 7:
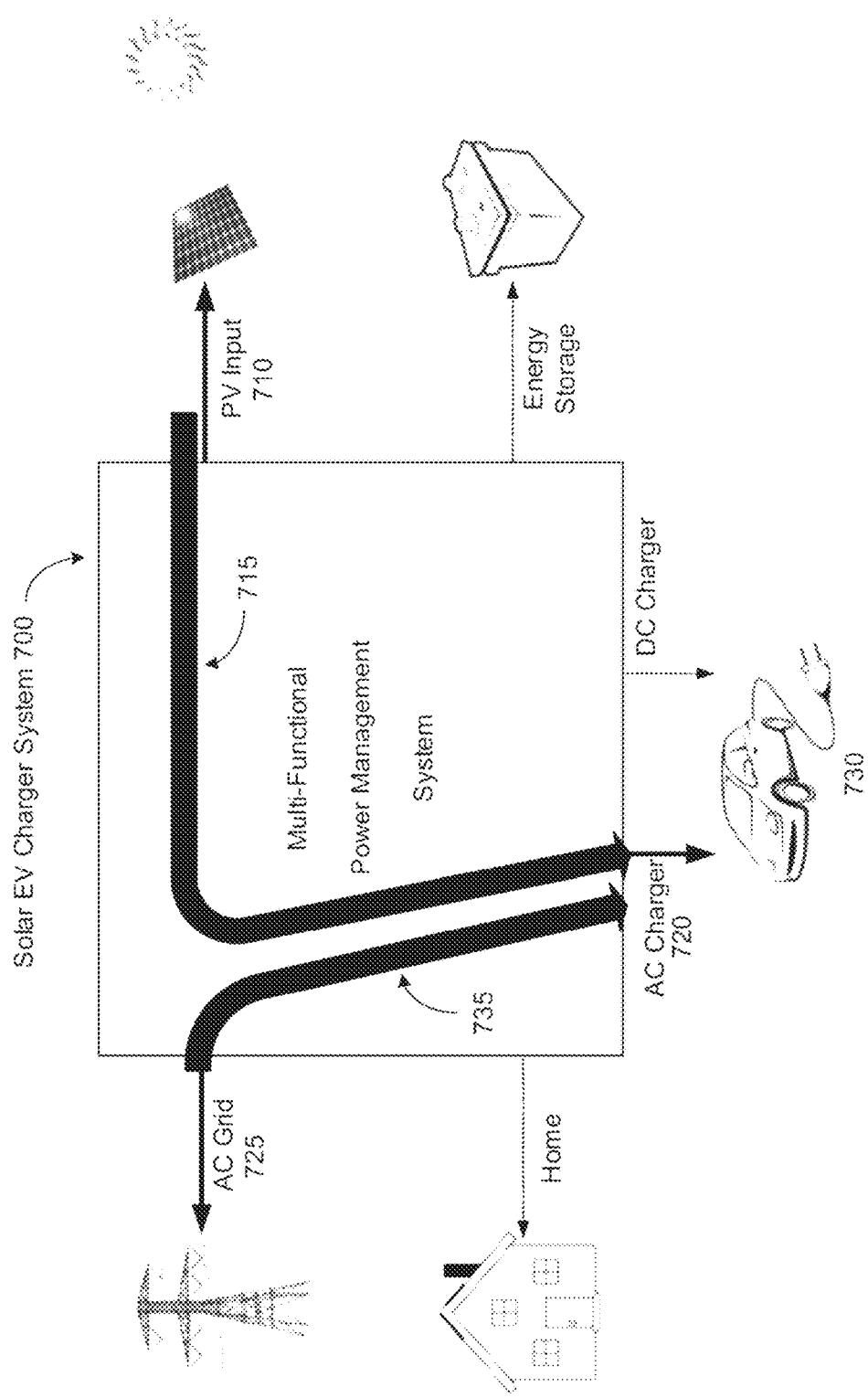
FIG. 7 illustrates power flow for a solar vehicle charger in accordance with the present design.

Unlike conventional converters that only process power in one direction, the BDC can be used for AC to DC or DC to AC conversion. Therefore, the MFPMS power electronics may perform multiple functions by merely instructing changes to controls, invoke sources and sinks, and establish connections for power flow paths. One example is shown in FIG. 7, where the various functions the MFPMS may provide are shown and the associated power flows are illustrated for a solar EV charger arrangement. From FIG. 7, two independent functions are shown performed simultaneously with a single bi-directional converter. Ability to perform two functions results from the AC to AC EV charging power transfer not requiring power conversion. The present design may realize this functionality in concert or parallel with another MFPMS function. For example, PV Input Solar DC to AC EV Charger power function is shown operating simultaneously in parallel with the AC Grid supply. Volt-ampere reactive (var) functions, not shown, may also be operating simultaneously and in conjunction with the described functions since the bi-directional converter may supply both real and reactive power to the grid. However, multiple functions that utilize the converter cannot be done simultaneously and may have to be scheduled to time share the converter. This is generally not an issue.

Figure 3:
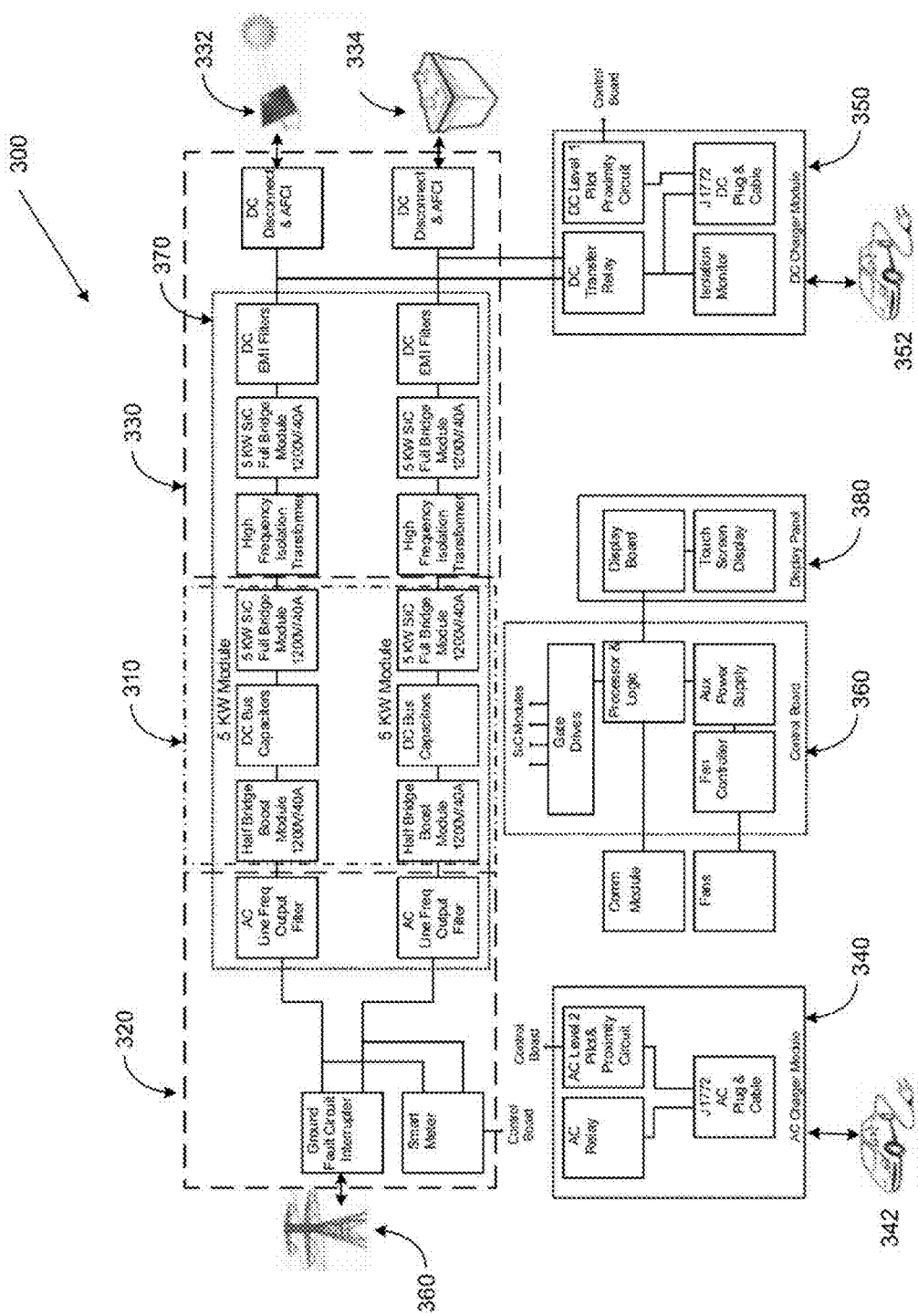
FIG. 3 is a detailed module block diagram for a multi-functional power management system illustrating the various modules and their associated components in accordance with an embodiment of the present design.

FIG. 3 illustrates a detailed MFPMS block diagram for the various modules and associated components in accordance with an embodiment of the present design and is similar in general construction to the representation of FIG. 2. Numbering between the elements of FIGS. 2 and 3 are similar. The exemplary modules, such as user control module 360 and BDC module 310, may provide for a flexible mechanism to tailor the system to meet many different configurations and also provide for future expansion or system upgrades. For example, if a homeowner first installs a solar inverter 332 and/or a string of inverters to power his home or return power to the grid, and decides later to purchase an electric vehicle, the homeowner may add a charger module such as AC Charger Module 340 or DC Charger Module 350 that suits the vehicle 342 and desired charging level, where such a power module integrates with the existing or contemplated solar inverter 332 and AC Grid 360 infrastructure components.

When advances evolve in EV charging or battery technology, such as progressing from Level 1 to Level 2 charging systems, the owner may purchase the newer technology EV, and accordingly may upgrade or swap out the charging system to suit the newly acquired vehicle and battery technology without the need to swap out other parts unless necessary to effectuate the new requisite functionality, with a device similar to or appropriately modified from that shown in FIG. 2 herein.

If the owner begins to experience power outages, or brownouts, in their area, he may add an energy storage device such as battery pack 334 to provide a backup power capability, with the energy of the pack sized to provide enough power for minutes, hours, or days. MFPMS 300 may be upgraded to provide backup power control, monitoring, and switching functionality using an energy storage management component.

From FIG. 3, dual 5 KW module arrangement 370 includes components connected in series that conceptually belong to different components shown in FIG. 2. In FIG. 3, there is provided a solar inverter 332 and battery pack 334 connected to DC interface module 330 of the dual 5 KW module arrangement 370, which includes the components shown such as DC disconnect and ACFI (Arc Fault Circuit Interrupter) elements, DC EMI filters, 5 KW SiC Full Bridge Modules and high frequency isolation transformers. BDC 310 includes a two half bridge boost modules, DC bus capacitors, and a pair of 5 KW SiC full bridge modules. Control may be provided from user control module 360, which includes gate drives, processor and logic, power supply (e.g. auxiliary), and a fan controller on a control board. Interfacing with the control board 360 is a communication module (ZigBee, WiFi, Cell PLC) and fans as necessary. A display panel 380 may be provided including a display board and user display, e.g. a touchscreen display.

AC interface module 320 may be provided, including a pair of AC line frequency output filters, a smart meter connected to a control board to monitor and possibly control power flow, and a GCFI, providing power in this arrangement to AC power grid 360.

AC charger module 340 and DC charger module 350 are shown connecting the foregoing circuits to electric vehicle 342 and/or electric vehicle 352. AC charger module 340 includes an AC relay, an AC Level 2 pilot and proximity circuit, in this arrangement connected to a control board, either control board 360 or another appropriate AC control board, and J1772 AC plug and cable. DC charger module 350 includes a DC transfer relay, a DC Level 1 pilot proximity circuit in this arrangement, connected to either control board 360 or an appropriate DC control board, an isolation monitor, and a J1772 DC plug and cable. In this arrangement DC transfer relay is connected to both DC EMI filters and to both DC disconnect and AFCI elements.

FIGS. 4-11 present various embodiments for implementing the multi-functional power management system (MFPMS) features, functions, and operations in accordance with the present design. Bi-directional converter system configuration examples are shown for the major converter functions and include a solar inverter, backup power, AC electric vehicle (EV) charger, solar EV charger, DC fast charger, vehicle to grid inverter, battery charger, and power quality corrector designs. The present design may provide converter facilities and functionalities using hardware, firmware, and/or software potentially including a tailored set of logic and operations to realize the desired operating capabilities disclosed herein. The MFPMS converter functions disclosed herein are not intended to limit the number of embodiments or applications of the embodiments of the design.

FIGS. 4-11 illustrate the complement of power sources and power sinks available for switching in or out of use as provided by the disclosed functionality. Sources and sinks illustrated with a solid line represent in-use connections for the particular embodiment illustrated. Sources and sinks not in-use are represented by dashed lines. For example, referring to FIG. 4, PV Input 410, PV Input (2) 440, AC Grid 420, and Home 425 are shown as in-use, that is illustrated by solid lines, and Energy Storage 430 is shown as out-of-service in the disclosed configuration, and shown illustrated as a dashed line.

Figure 4:
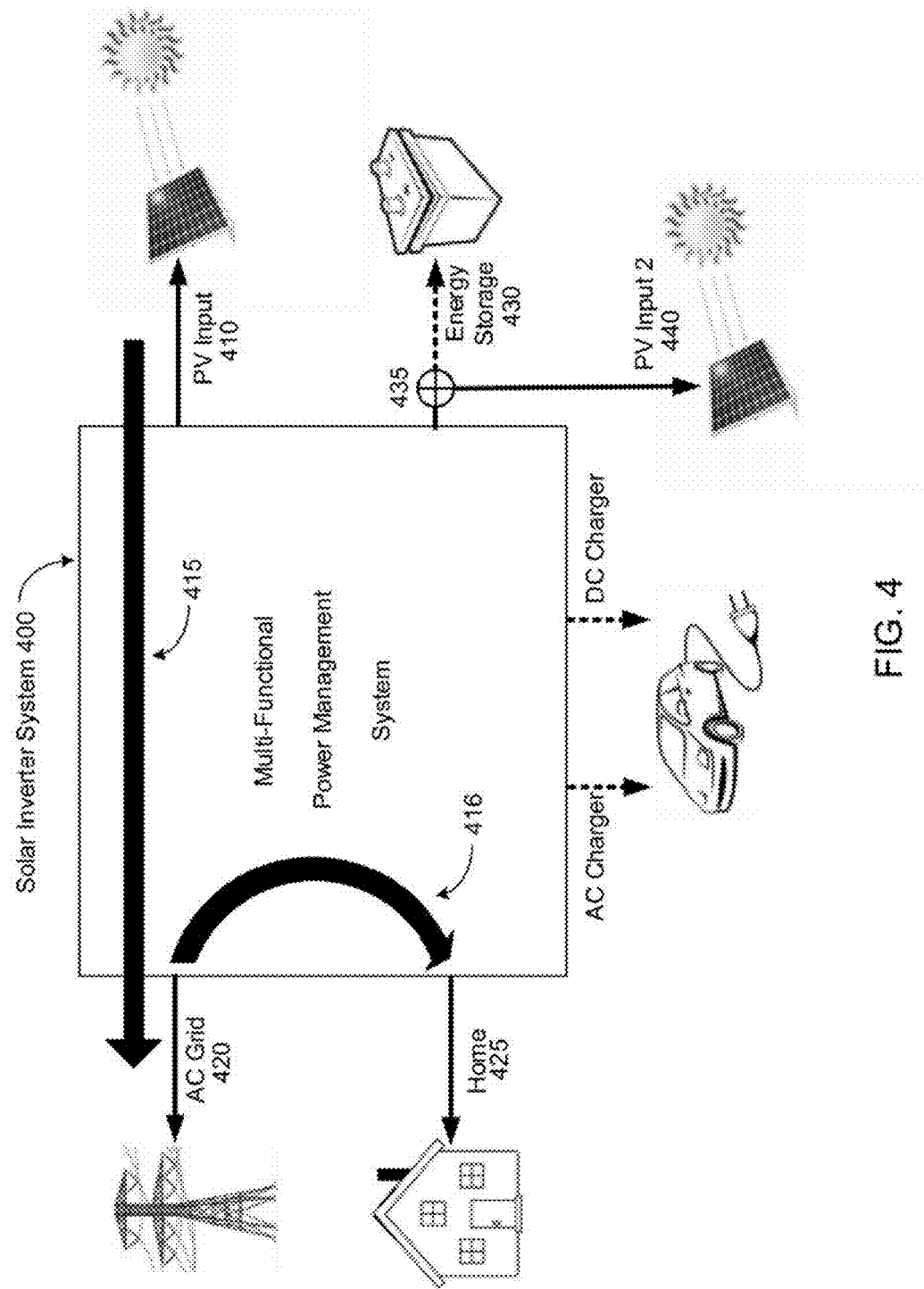
FIG. 4 illustrates power flow for a solar inverter in accordance with the present design.

A converter system is illustrated in FIG. 4 for a solar inverter MFPMS application in accordance with an embodiment of the present design. Solar Inverter System 400 may receive DC power from PV Input source 410, such as collected from a solar panel array or string, and may convert the DC power into AC power suitable for delivery to AC Grid 420 sink via power flow path 415. In this arrangement the system switches the bi-directional converter to operate between the DC solar array source and the AC grid sink to realize the desired power flow. In a similar arrangement, the MFPMS may deliver AC power to Home 425 via power flow path 416, where home 425 may include a plurality of household AC loads.

In general, converter system 400 may connect PV Input solar panel arrays or strings typically operating at voltages between 100-400V DC and power levels up to 10 kW with the AC grid 420. The converter system may monitor and control PV maximum peak power tracking (MPPT) functionality for at least one string. In a further arrangement, converter system 400 may monitor and control managing maximum power delivery from multiple strings, multiple MPPTs, and combinations thereof using conversions and power transfers as disclosed herein. The converter system may include a second DC power input such as Energy Storage (ES) module 430, comprising for example a battery. The converter system may alternately provide a second PV Input (2) module 440 by configuring switch 435 to disconnect the ES module 430 and establish a connection with PV Input (2) 440. In this arrangement the present design may operate with either PV Input 410, PV Input (2) 440, or both source inputs in combination, for example in connecting multi-string installations for concurrent use. Converter system 400 may be constructed in a manner similar to that shown in FIG. 2 including similar components and/or additional components.

Figure 5:
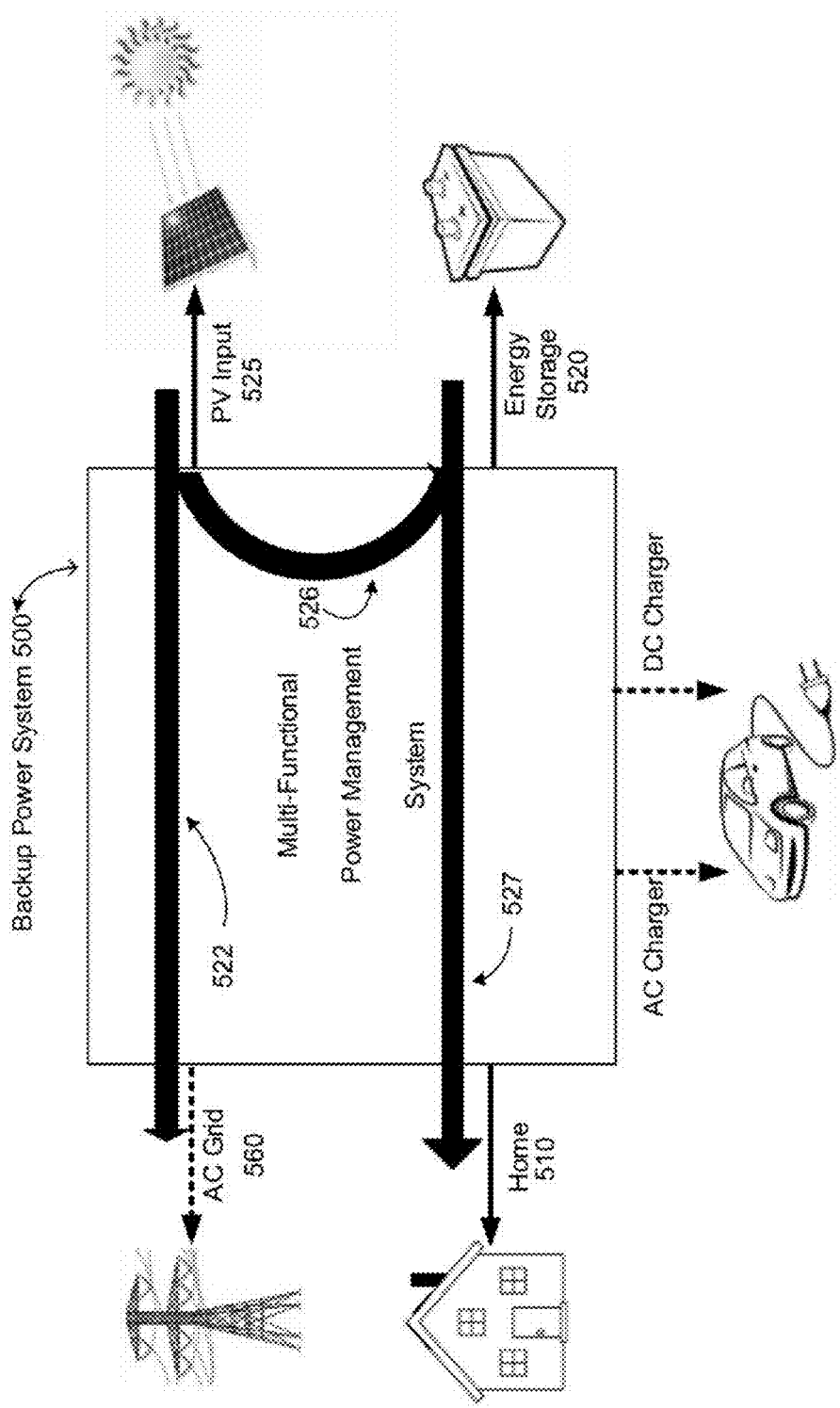
FIG. 5 illustrates power flow for a backup power system in accordance with the present design.

An alternate embodiment is illustrated in FIG. 5 for an exemplary backup power MFPMS application. Backup Power System 500 may receive DC power from PV Input source 525, such as collected from a solar panel array or string, and may convert the DC power into AC power suitable for delivery to AC grid 560 via power flow path 522. Backup Power System 500 may convert DC power from either Energy Storage 520, comprising an energy source such as a battery, via power flow path 527, or PV Input source 525 via power flow path 522, to AC power in order to drive household AC loads at a sink at Home 510.

Alternately, power may be converted using a combination of power from PV Input 525 and Energy Storage 520, from DC to AC. In the situation where the backup power converter system 500 employs concurrent sourcing from ES 520 and PV Input 525, the amount of power available may be limited to the sum of the power delivered from the PV solar panel array and the ES batteries in combination. Backup power converter system 500 may be constructed in a manner similar to that shown in FIG. 2 including similar components and/or additional components.

Figure 6:
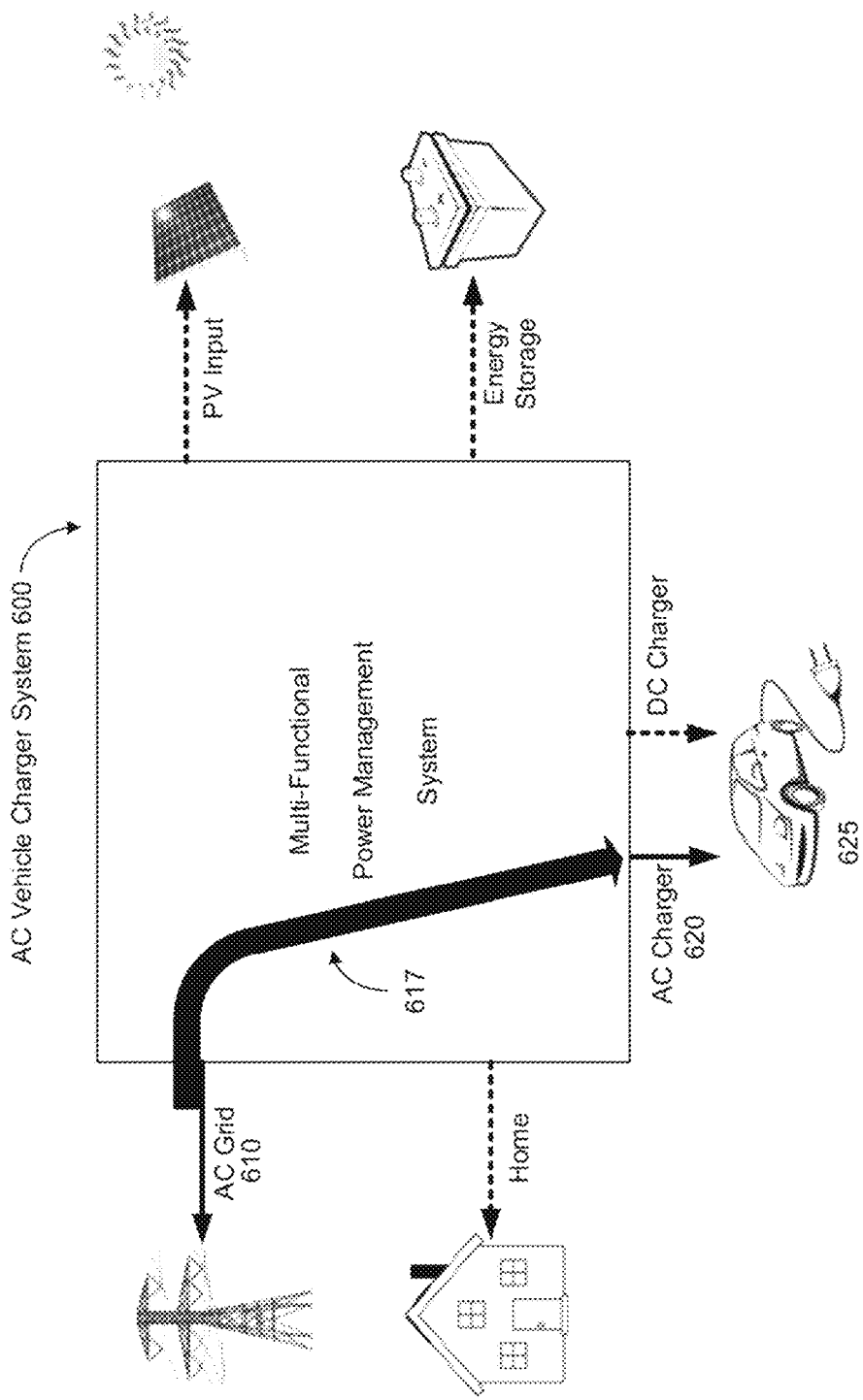
FIG. 6 illustrates power flow for an AC vehicle charger in accordance with the present design.

A further embodiment for converter system is illustrated in FIG. 6. AC Vehicle Charger System 600 may receive AC power from AC Grid source 610, for example 240 volt single phase power, and connect, or switch, the AC power for use by AC Charger 620 sink, for example a Level 2 AC Charger module, via power flow path 617. In this arrangement the design may transmit AC power from the utility grid to the AC Charger module in order to charge the electric vehicle's internal battery. AC Charger 620 module may include necessary compatible power connectors, such as the Society of Automotive Engineers (SAE) J1772 standard compliant connectors and the like, electrical disconnects, communication, and safety circuits needed to realize delivery of AC Level 2 power to the vehicle's on-board charger component. In this arrangement, the bi-directional converter facility is not required during switching an AC source to an AC sink by the MFPMS, and the MFPMS may facilitate concurrent operation of the multiple functions discussed herein. AC Vehicle Charger System 600 may be constructed in a manner similar to that shown in BDC 200 in FIG. 2 including similar components and/or additional components.

FIG. 7 illustrates a solar EV charging MFPMS application. Solar Vehicle Charger System 700 may receive DC power from PV Input 710 source, such as a solar panel array, and connect, or switch, the bi-directional converter into use to invert the DC power source into AC power to supply AC Charger 720 sink, for example a Level 2 AC Charger module, via power flow path 715. In this arrangement, converter system 700 may receive DC power from the PV panels and convert the DC power to AC power for the AC charger module 720. Typically, PV Input 710 may provide power levels from 3 to 4 kW in order to adequately support AC Level 2 charging. If the capacity of the string, or multiple strings, is not adequate for realizing AC Level 2 charging of electric vehicle 730, the present design may be arranged to supplement the PV source by connecting AC Grid 725 in parallel through power flow path 735. Solar Vehicle Charger System 700 may be constructed in a manner similar to that shown in BDC 200 in FIG. 2 including similar components and/or additional components.

Figure 8:
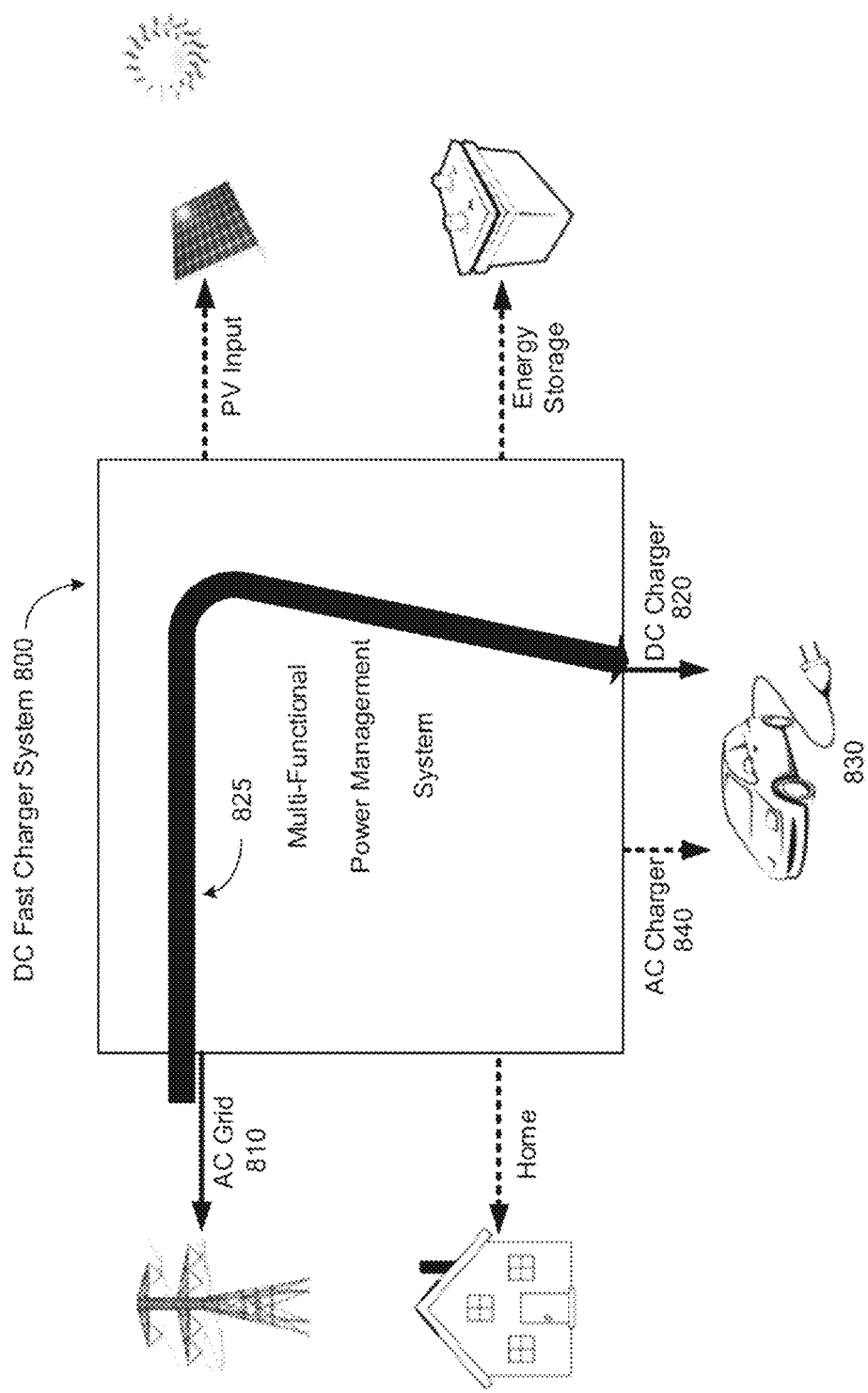
FIG. 8 illustrates power flow for a DC vehicle fast charger in accordance with the present design.

FIG. 8 illustrates a DC Fast Charger System 800 that delivers power from AC Grid 810 to DC Charger 820. In this arrangement, DC Charger 820 may provide DC Level 1 fast charging (capable of power levels up to 10 KW) via power flow path 825 through DC Fast Charger System 800 using the internal 10 kW BDC directly connected to batteries within EV 830. Some of today's electric vehicles are provisioned for either DC Level 1 charging or AC Charger 840 Level 2 facilities, typically capable of operating at power levels at either 3.3 or 6.6 kW, where the vehicle's AC charging facilities typically include an on board charger. DC Fast Charger System 800 may be constructed in a manner similar to that shown in FIG. 2 including similar components and/or additional components.

Figure 9:
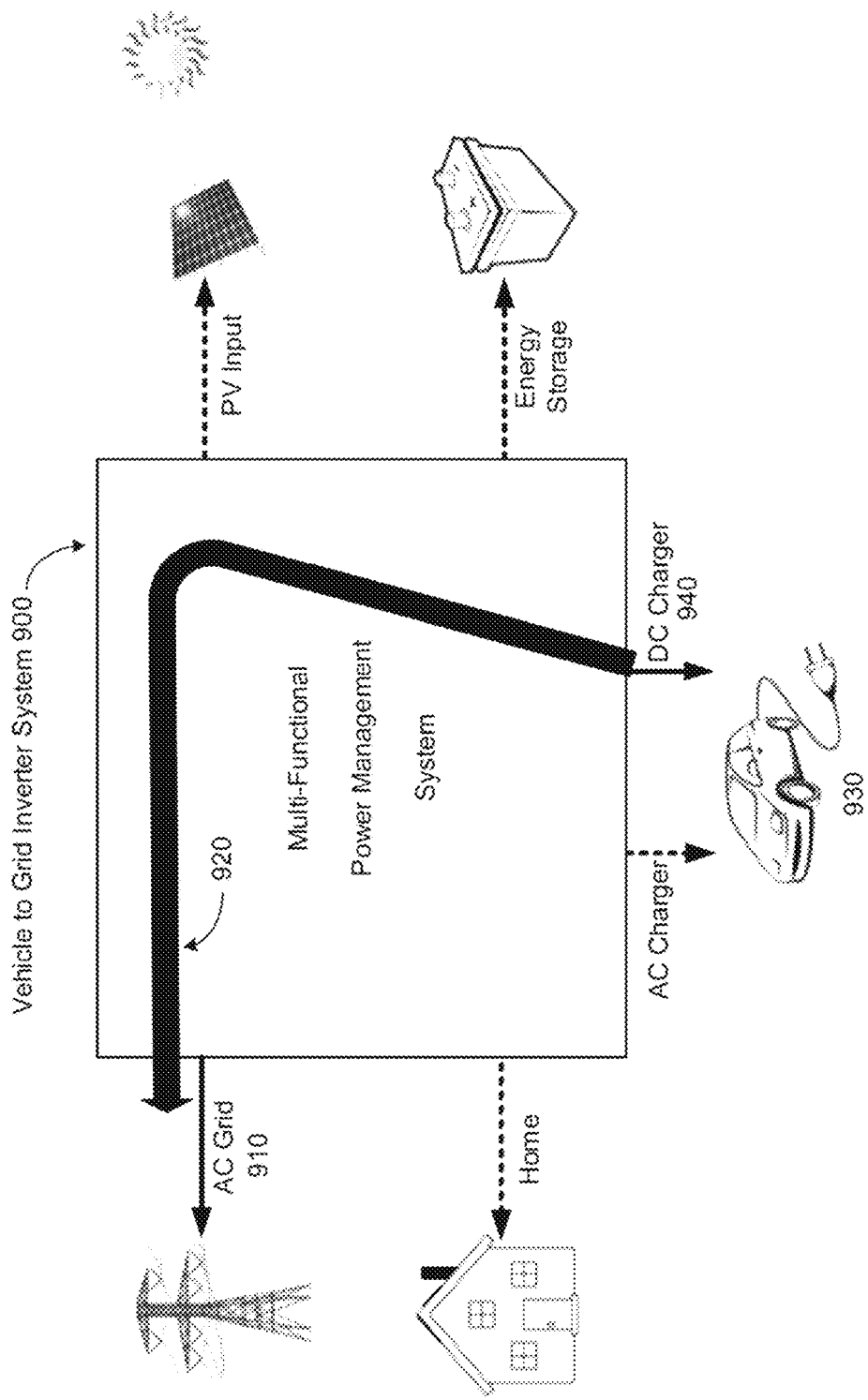
FIG. 9 illustrates power flow for a vehicle to AC grid inverter in accordance with the present design.

FIG. 9 illustrates an electric vehicle supplying power onto the utility grid. In this embodiment, vehicle to grid inverter system 900 may provide a distributed electrical source transferring power to AC Grid 910. Conceptually, this design is referred to as vehicle to grid (V2G), and delivers clean distributed energy from millions of distributed EVs connected to the AC utility grid while managed using smart grid functionality. In an exemplary configuration, communication facilities are provided imbedded within the MFPMS converter apparatus, wherein the utility company can access localized power generation from participating EV owners to help supply power stored in their vehicles during peak load periods, for example. Power flow path 920 illustrates a connection originating from the batteries within electric vehicle 930 via DC Charger module 940, wherein the BDC, similar to BDC 200 in FIG. 2, may be switched into use to process the DC power into AC power to supply AC Grid 910 sink in a manner and at a level acceptable to be received by, for example, a local utility power company.

Figure 10:
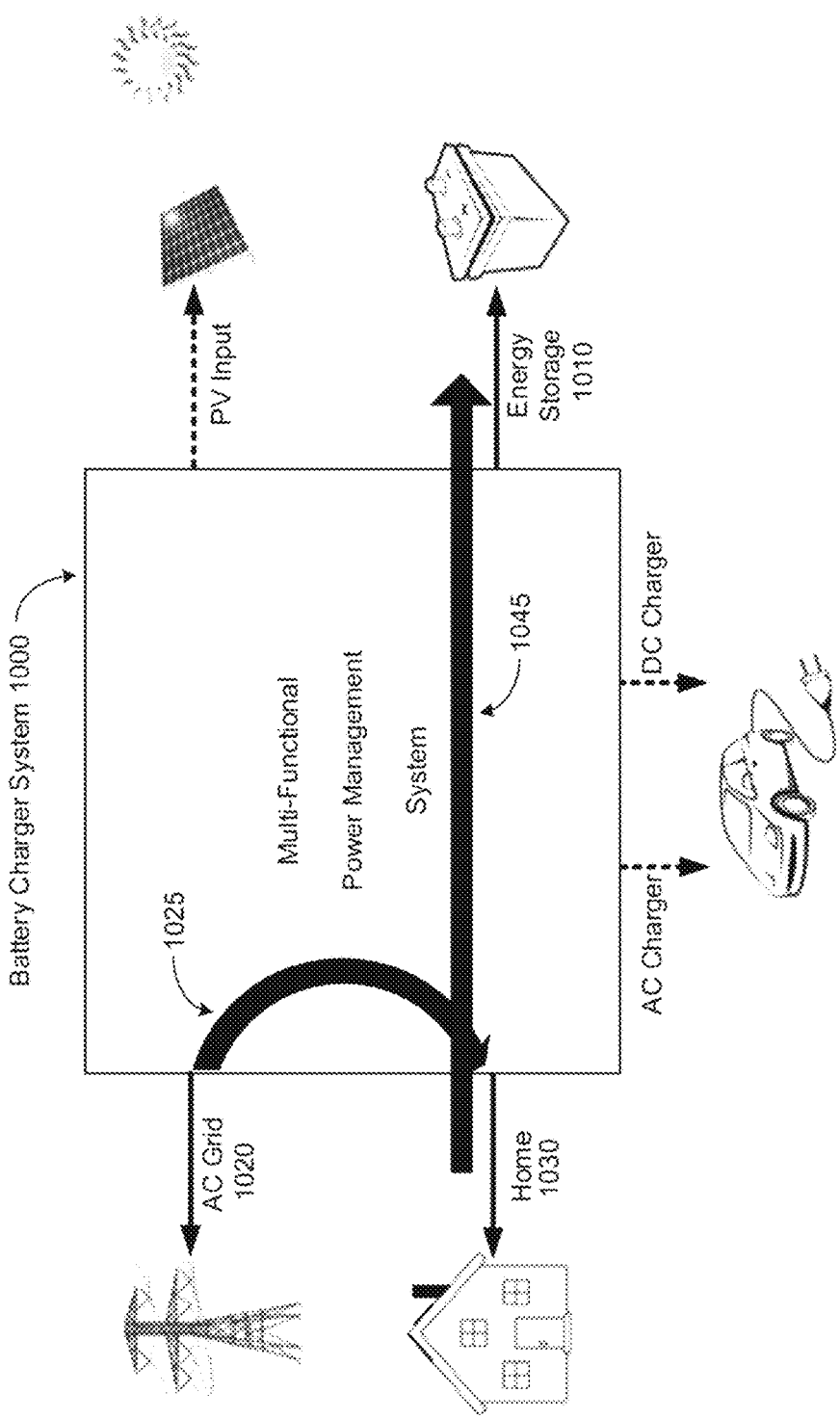
FIG. 10 illustrates power flow for a battery charger in accordance with the present design.
Figure 11:
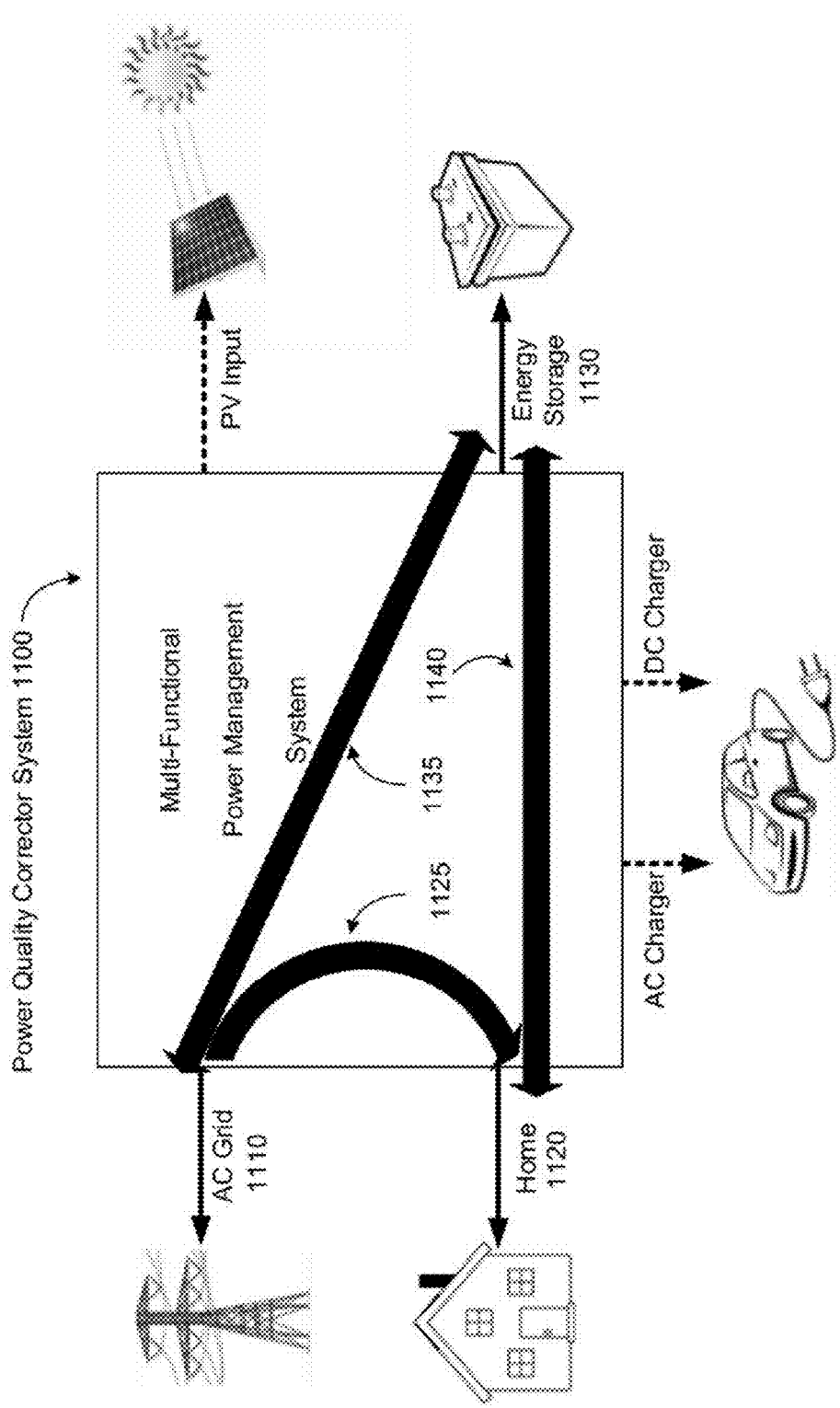
FIG. 11 illustrates power flow for a power quality corrector in accordance with the present design.

Referring to FIG. 10, Battery Charger System 1000 may maintain the backup battery charge by using a BDC such as the BDC of FIG. 2 between the grid, i.e. AC Grid 1020, and the battery such as battery 1010. In this embodiment, AC Grid 1020 may supply power via power flow path 1025, where the battery charger system 1000 may be physically housed or deployed in Home 1030. AC power is converted to DC power by the converter system and transmitted to Energy Storage 1010 via power flow path 1045 to charge batteries within Energy Storage 1010. The system may maintain battery charges on an as needed basis or according to a predetermined programmable schedule sufficient for ensuring an available ready charge state battery condition. The present design may maintain charge for a number of different storage battery chemistries based on a management system or algorithm managing the rate and duration, or charge duty cycle, for each battery type. Battery Charger System 1000 may be constructed in a manner similar to and/or including components such as those shown in the BDC of FIG. 2.

The system may correct poor local power line AC deviations, distortions, and noise. In certain instances, local power can be distorted for a number of reasons such as poor power factor resulting from local loads, harmonics frequencies injected into the line, brownouts, and like contributions. From FIG. 11, power quality corrector system 1100 may monitor and adjust the AC power received from the utility AC Grid 1110. Dynamically monitoring and then adjusting the AC power, the system may provide for clean, i.e. distortion free, and sufficient AC power to Home 1120, and may inject reactive power into the AC line to compensate for local loads with either a leading or lagging power factor based on determinations made by the system.

The system may connect AC Grid 1110 to Home 1120 and provide power in the manner previously disclosed, wherein power quality corrector system 1100 facilities are realized using bi-directional conversion via power path 1125. In another exemplary arrangement the system may connect AC Grid 1110 to Energy Storage 1130 and convert AC power to DC power via power flow path 1135. During times power from AC Grid 1110 is of poor quality, the system may convert DC power received from Energy Storage 1130 to AC power and transfer this clean source of power to Home 1120 via power flow path 1140. As with the other embodiments, power quality corrector system 1100 may be constructed in a manner similar to and/or including components such as those shown in the BDC of FIG. 2.

Figure 12:
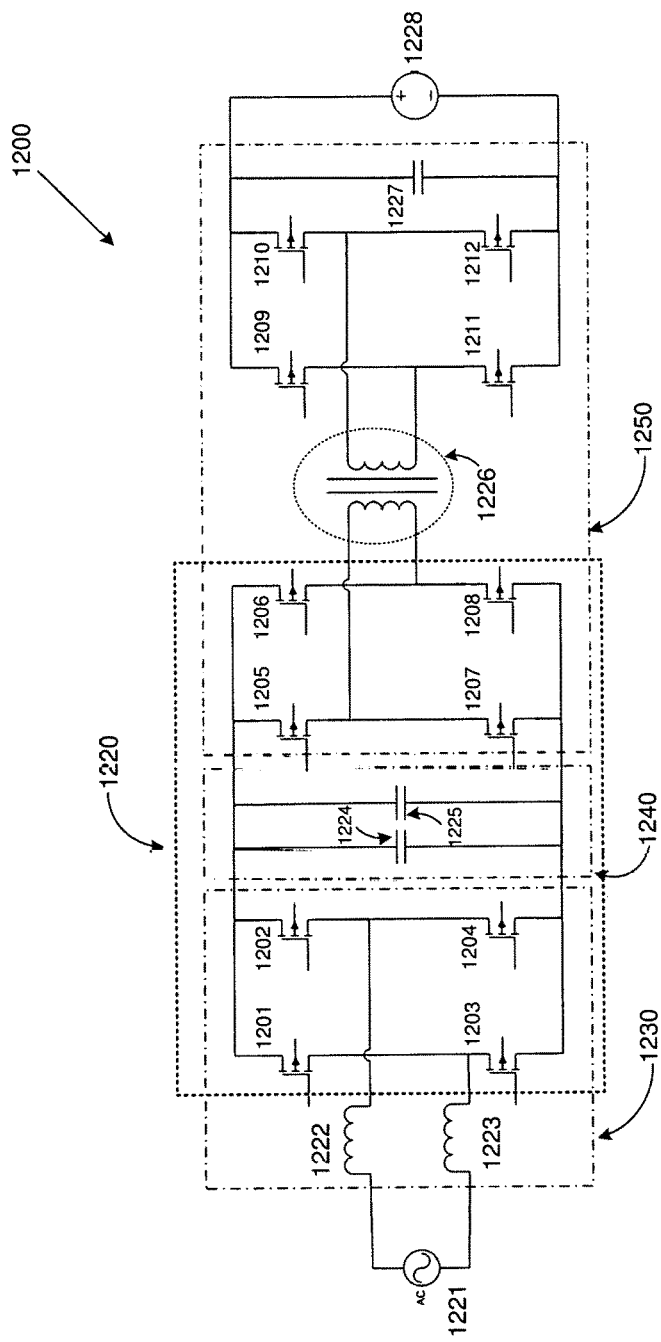
FIG. 12 is a schematic diagram illustrating a bi-directional AC-DC power converter in accordance with an embodiment of the present design.

FIG. 12 illustrates a schematic diagram for an exemplary AC to DC power converter in accordance with one embodiment of the present design and the depiction of FIG. 12 may be similar or identical to the Bi-Directional AC-DC converter 210 of FIG. 2. From FIG. 12, High Voltage AC to DC power converter system 1200 includes switching devices, including switches 1201-1212, that comprise field effect transistors (FETs), or any other suitable device that may provide the same switching functionality as field effect transistors. The present design's converter system 1200 illustrated in FIG. 12 may include a full-bridge bi-directional circuit arrangement 1220 as shown. Alternately, the design topology may be realized using half-bridge, unidirectional bridge, resonant, semi-resonant, and like switching arrangements.

Broken down, the left side of the diagram shows a single phase AC energy source 1221 coupled to inductors 1222 and 1223 within AC-DC Boost Converter 1230, which also includes switches 1201, 1202, 1203, and 1204. DC Link Capacitor section 1240 includes capacitors 1224 and 1225, and more or fewer such capacitors may be employed, while isolated DC-DC Converter 1250 includes switches 1205-1212, high frequency transformer 1226, and capacitor 1227 and may provide galvanic isolation. To the right is DC voltage source 1228.

Not shown in FIG. 12 is a controller coupled to the High Voltage AC to DC power converter system 1200, where the controller is configured to influence operation of the High Voltage AC to DC power converter system 1200 to manage power transfer between single phase AC energy source 1221 and DC voltage source 1228 using switches 1201-1212.

Employing two conversion stages may allow for the DC link voltage to operate at any value higher than the peak AC voltage, which is 350 volts DC for a 240 volt AC line. This is due to the characteristics of boost converter 1230 that requires the DC output to always operate higher than the AC input. The highest value of the DC link is determined by the breakdown voltage of the switches, and in this embodiment the BDC may include 1000V DC devices; however, the design is not limited in this way and may include higher voltage devices if needed for satisfying various predetermined system operational parameters.

Recognizing the energy stored in a capacitor increases as the voltage squared, or conversely the capacitance needed goes down by the square root of the voltage, the BDC design may dramatically reduce the capacitance value by increasing the DC link voltage. For example, if the DC link voltage is increased from 336 volts to 1,000 volts, the design capacitance value needed is reduced by a factor of 9:1. Configuring the BDC to operate at 1000V DC may provide for a reduction in capacitance sufficient to make use plastic film capacitors. The use of plastic film capacitors in this exemplary design, which have a lower capacitance to volume ratio, may provide for an improvement in overall reliability. Film capacitors are constructed from many different materials and may be selected based on the demands for the particular application. The present BDC design may benefit from involving film capacitors due to their inherent characteristics including long service life, in comparison to electrolytic capacitor devices, high breakdown voltages, self healing for pin holes resulting from dielectric breakdowns, non-polarized operation, low power dissipation, and high ripple current capacity.

The basic requirements for the present designs Bi-Directional Converter include bi-directional power flow for converting AC power to DC power and converting DC power to AC power, operating efficiency greater than 96 percent, modularized construction, scalable to various power levels, 240 VAC single or split phase AC input, compatible with PV strings operating up to 400V and 600V maximum on DC input, power factor correction on AC input, galvanic isolation, line frequency synchronization to AC Grid, stand-alone whole house power with anti-islanding feature, voltage and current regulation within one percent, provisioned with converter logic and gate drives, high frequency switching (affording small size and weight), meeting applicable regulatory and safety standards.

High levels of integration for complex systems with numerous power sources can become cumbersome and difficult, but may provide for lower overall system cost and yield higher performance. The present design's modular and scalable building block modules may provide for well-defined and understood functionality subsets and may simplify service integration and afford a method for minimizing the risk during integration of functions, components, and devices. The present design's modular functional architecture may eliminate many of the duplicated functions found in standalone components reducing complexity and cost and may provide an increase in system reliability. The disclosed design manages interconnects and the overall bus structure to ensure deployment of low inductance within the system and may allow for significantly lower cost than integrating standalone components.

The present design is directed to a multi-functional power converter system involving modular and scalable construction techniques, and having a bi-directional converter centralized intelligence and communication facilities that together form an intelligent power management system, wherein the converter may perform AC to DC or DC to AC conversions, and the power electronics may perform multiple functions by merely changing controls and/or sources.

According to a first aspect of the present design, there is provided a power management apparatus configured to connect a plurality of DC power elements to a plurality of AC power elements. The power management apparatus comprises a DC interface module connected to the plurality of DC power elements, a bi-directional AC-DC converter connected to the DC interface module, and an AC interface module connected to the bi-directional AC-DC converter and the AC power elements.

According to another aspect of the design, there is provided a power management apparatus, comprising a DC interface module connected to a plurality of DC power elements, a bi-directional AC-DC converter connected to the DC interface module, and an AC interface module connected to the bi-directional AC-DC converter and a plurality of AC power elements.

According to a further aspect of the design, there is provided a power management apparatus comprising a bi-directional AC-DC converter comprising a bidirectional boost converter coupled to an AC source, a high voltage DC link capacitor circuit coupled to the bidirectional boost converter and comprising at least one capacitor and a DC to DC converter circuit coupled to the high voltage DC link capacitor circuit and to a DC source. The bi-directional AC-DC converter is further coupled to at least one of AC and DC interface electric vehicle charging hardware.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A power management apparatus configured to connect a plurality of DC power elements to a plurality of AC power elements and usable to provide AC to DC and DC to AC conversion, the power management apparatus comprising:
    a DC interface module connected to the plurality of DC power elements;
    a bi-directional AC-DC converter configured to operate at 1000V DC and connected to the DC interface module;
    an AC interface module connected to the bi-directional AC-DC converter and the AC power elements;
    a DC charging module connected to the DC interface module and configured to charge first power sources requiring DC charge;
    an AC charging module connected to the AC interface module, rated for AC charging up to 18 kW, and configured to charge second power sources requiring AC charge; and
    a user control module connected to the bi-directional AC-DC converter and configured to provide user control and coordination of power conversion processes between the DC interface module, the bi-directional AC-DC converter, the AC interface module, the DC charging module, and the AC charging module;
    wherein the bi-directional AC-DC converter comprises a high voltage DC link capacitor circuit comprising two plastic film capacitors connected in parallel, the two plastic film capacitors each free of any connection to a resistor, and a plurality of switches controllable to provide a DC link capacitor circuit voltage between 350 and 1000V for a 240V AC input with an output power up to 10 KW.

2. The power management apparatus of claim 1, wherein the bi-directional AC-DC converter further comprises:
    a bidirectional boost converter circuit coupled to the AC interface module; and
    a DC to DC converter circuit coupled to the high voltage DC link capacitor circuit and the DC interface module.

3. The power management apparatus of claim 1, wherein the AC charging module is configured to connect to an electronic vehicle.

4. The power management apparatus of claim 1, wherein the DC charging module is configured to connect to an electronic vehicle.

5. The power management apparatus of claim 1, wherein the AC power elements comprise at least one of an AC power grid and a household AC load arrangement.

6. A power management apparatus usable to provide AC to DC and DC to AC conversion, comprising:
    a DC interface module connected to a plurality of DC power elements;
    a bi-directional AC-DC converter configured to operate at 1000V DC and connected to the DC interface module;
    an AC interface module connected to the bi-directional AC-DC converter and a plurality of AC power elements;
    a DC charging module connected to the DC interface module and configured to charge first power sources requiring DC charge;
    an AC charging module connected to the AC interface module, rated for AC charging up to 18 kW, and configured to charge second power sources requiring AC charge; and
    a user control module connected to the bi-directional AC-DC converter and configured to provide user control and coordination of power conversion processes between the DC interface module, the bi-directional AC-DC converter, the AC interface module, the DC charging module, and the AC charging module;
    wherein the bi-directional AC-DC converter comprises a high voltage DC link capacitor circuit comprising two plastic film capacitors connected in parallel, the two plastic film capacitors each free of any connection to a resistor, and a plurality of switches controllable to provide a DC link capacitor circuit voltage between 350 and 1000V for a 240V AC input with an output power up to 10 KW.

7. The power management apparatus of claim 6, wherein the bi-directional AC-DC converter further comprises:
    a bidirectional boost converter circuit coupled to the AC interface module; and a DC to DC converter circuit coupled to the high voltage DC link capacitor circuit and the DC interface module.

8. The power management apparatus of claim 6, wherein the AC charging module is configured to connect to an electronic vehicle.

9. The power management apparatus of claim 6, wherein the DC charging module is configured to connect to an electronic vehicle.

10. The power management apparatus of claim 6, wherein the AC power elements comprise at least one of an AC power grid and a household AC load arrangement.

11. A power management apparatus usable to provide AC to DC and DC to AC conversion, comprising:
- a bi-directional AC-DC converter configured to operate at 1000V DC comprising:
  - a bidirectional boost converter circuit coupled to an AC source;
  - a high voltage DC link capacitor circuit coupled to the bidirectional boost converter; and
  - a DC to DC converter circuit coupled to the high voltage DC link capacitor circuit and to a DC source;
- wherein the bi-directional AC-DC converter is coupled to a DC interface module connected to a DC charging module configured to charge first power sources requiring DC charge and an AC interface module and an AC charging module rated for AC charging up to 18 kW and configured to charge second power sources requiring AC charge;
- wherein the high voltage DC link capacitor circuit comprises two plastic film capacitors connected in parallel, the two plastic film capacitors each free of any connection to a resistor, and a plurality of switches controllable to provide a DC link capacitor circuit voltage between 350 and 1000V for a 240V AC input with an output power up to 10 KW.

12. The power management apparatus of claim 11, wherein the bi-directional AC-DC converter is connected to an AC interface module connected to at least one of an AC power grid and a household AC load arrangement.

13. The power management apparatus of claim 11, wherein the bi-directional AC-DC converter is connected to a DC interface module connected to at least one of a solar panel arrangement and an energy storage device.

14. The power management apparatus of claim 11, wherein the bi-directional AC-DC converter is employed with 1000 VDC devices.

* * * * *